United States Patent Office 2,846,471
Patented Aug. 5, 1958

2,846,471
PROCESSES FOR THE OXIDATION OF SULFIDE COMPOUNDS AND PRODUCTS THEREOF

Edgar A. Blair, Upper Darby, and Allison Maggiolo, Merion, Pa., assignors to The Welsbach Corporation, Philadelphia, Pa., a corporation of Delaware No Drawing. Application April 10, 1956
Serial No. 577,194

2 Claims. (Cl. 260—537)

This invention relates to processes for obtaining new compositions of matter and to the products thereof. More particularly this invention relates to processes for the oxidation by ozone of poly-functional compounds and to the products thereof. Even more particularly this invention relates to the oxidation of sulfide compounds by ozone and to the resulting sulfoxide compounds.

Heretofore processes for the oxidation of certain sulfide compounds to obtain the corresponding sulfoxide compounds have been known employing powerful chemical oxidants. In the case of the sulfide compounds employed as the starting materials in the present invention, however, it has not been possible to obtain the corresponding sulfoxide compounds because the powerful chemical oxidants heretofore employed have reacted with other parts of the molecule.

Most unexpectedly we have found that a sulfide compound of the type:

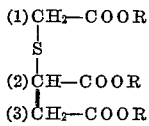

where R may be H, an alkyl or an aryl group, and having activated secondary and tertiary carbons at (1), (2) and (3), may be oxidized employing ozone as the oxidant to obtain the corresponding sulfoxide of the type:

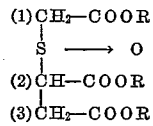

without the concurrent attack at these activated carbons when theoretical amounts of ozone are employed.

The sulfoxide compounds obtained in accordance with the processes of the present invention are novel compounds useful as metal chelating and deactivating agents; as resins and plasticizers; as stabilizers; as surface active agents; as oil additives; as additives to rubber; as agricultural and pharmaceutical chemicals; and for other and numerous uses.

It is accordingly an object of the present invention to provide novel processes for the oxidation of sulfide compounds employing ozone as the oxidant to obtain novel sulfoxide compounds.

Another object of the present invention is to provide novel sulfoxide compounds.

Another object is to provide novel processes for obtaining carboxymethylthionylsuccinic acid using ozone as the oxidant.

Another object is to provide novel compositions of matter, carboxymethylthionylsuccinic acid and the derivatives thereof including its alcohol esters.

Other and further objects of the present invention will appear from the following description of illustrative processes and embodiments thereof and the resulting products.

Various embodiments of the present invention are described hereinafter for purposes of illustrating the same and should in no way be construed as defining or limiting the invention, reference being had to the appended claims to determine the scope of the present inventive concept.

In accordance with a process within the scope of the present invention 2.08 g. of carboxymethylmercaptosuccinic acid, M. P. 136–138° C., were dissolved in 100 ml. of ethyl acetate; then cooled externally with a Dry-Ice methanol bath; and then oxidized with ozonated oxygen in which the ozone concentration with 2.45 g./cu. ft. A total of 0.458 g. of ozone were absorbed. Theoretical ozone required was 0.48 g. Petroleum ether was then added to the reactants as a precipitating agent. 2.33 g. of a crystalline product, carboxymethylthionylsuccinic acid were obtained. Calculated theoretical analysis for the acid $C_6H_8O_7S$ was C=32.1 and H=3.6. Experimental analysis showed C=32.3 and H=3.7.

In accordance with another embodiment of the present invention 5.00 g. of carboxymethylmercaptosuccinic acid, M. P. 136–138° C., were dissolved in 50 ml. of ethyl acetate by heating to boiling. The solution was cooled without separation of the solute. External cooling was provided by a Dry-Ice methanol bath. The solution was then oxidized with ozonated oxygen in which the ozone concentration was 2.34 g./cu. ft. A total of 1.15 g. of ozone were absorbed. Theoretical ozone required was 1.15 g. Petroleum ether was then added as a precipitating agent. 5.3 g. of a crystalline product, carboxymethylthionylsuccinic acid were obtained.

It should now be apparent to those skilled in the art that the present invention in every way satisfies the several objectives described above and provides novel processes for the oxidation of sulfide compounds using ozone as the oxidant to obtain sulfoxide compounds.

Changes in or modifications to the above described illustrative procedures and to the products thereof may now be suggested without departing from the present inventive concept. Reference should therefore be had to the appended claims to determine the scope of this invention.

What is claimed is:

1. A composition of matter, carboxymethylthionylsuccinic acid.

2. In a process for producing an organic sulfoxide the steps of reacting carboxymethylmercaptosuccinic acid with ozone and then separating out carboxymethylthionylsuccinic acid.

References Cited in the file of this patent

UNITED STATES PATENTS 2,581,514   Chilcote _____ Jan. 8, 1952

OTHER REFERENCES

Larsson: Chem. Abstracts, vol. 40, 1946, column 2796.
Groggins: Unit Processes in Organic Synthesis, 4th edition, 1952, page 429.